(12) United States Patent
Panish

(10) Patent No.: US 9,654,053 B2
(45) Date of Patent: May 16, 2017

(54) SOLAR MODULE SUPPORT STRUCTURE

(71) Applicant: Sun Energy, Inc., Irvine, CA (US)

(72) Inventor: David Panish, Irvine, CA (US)

(73) Assignee: SUN ENERGY, INC., Irvine, CA (US)

( * ) Notice: Subject to any disclaimer, the term of this patent is extended or adjusted under 35 U.S.C. 154(b) by 0 days.

(21) Appl. No.: 15/255,085

(22) Filed: Sep. 1, 2016

(65) Prior Publication Data

US 2017/0063295 A1    Mar. 2, 2017

Related U.S. Application Data

(60) Provisional application No. 62/213,073, filed on Sep. 1, 2015.

(51) Int. Cl.
| | |
|---|---|
| *H01L 31/054* | (2014.01) |
| *H02S 40/22* | (2014.01) |
| *H01L 31/068* | (2012.01) |
| *H02S 20/32* | (2014.01) |

(52) U.S. Cl.
CPC .......... *H02S 40/22* (2014.12); *H01L 31/0684* (2013.01); *H02S 20/32* (2014.12)

(58) Field of Classification Search
CPC .......................... H01L 31/0547; H01L 31/054
See application file for complete search history.

(56) References Cited

U.S. PATENT DOCUMENTS

| | | |
|---|---|---|
| 4,169,738 A | 10/1979 | Luque |
| 4,311,132 A | 1/1982 | Van Kuijk |
| 4,572,160 A | 2/1986 | Blikken et al. |
| 4,841,946 A | 6/1989 | Marks |
| 5,538,563 A | 7/1996 | Finkl |
| 6,294,723 B2 | 9/2001 | Uematsu et al. |
| 7,932,461 B2 | 4/2011 | Johnson et al. |
| 7,968,791 B2 | 6/2011 | Do et al. |
| 8,207,482 B2 | 6/2012 | Rosa |
| 8,338,694 B2 | 12/2012 | Hoffman et al. |
| 8,338,770 B2 | 12/2012 | Depaoli |
| 2003/0201008 A1 | 10/2003 | Lawheed |
| 2009/0120486 A1 | 5/2009 | Buller |
| 2009/0308432 A1 | 12/2009 | Meyers |
| 2010/0012169 A1 | 1/2010 | Jensen et al. |
| 2010/0024866 A1 | 2/2010 | Durvasula et al. |
| 2010/0218807 A1 | 9/2010 | Arbore et al. |
| 2010/0282295 A1 | 11/2010 | Gomery |
| 2010/0326495 A1 | 12/2010 | Gronet et al. |
| 2011/0120524 A1 | 5/2011 | Wares et al. |
| 2011/0162691 A1 | 7/2011 | Hartelius |
| 2011/0277819 A1 | 11/2011 | Scheulov |
| 2012/0247533 A1 | 10/2012 | Sanzone et al. |
| 2013/0192662 A1 | 8/2013 | Snidow |
| 2013/0220401 A1 | 8/2013 | Scheulov |

(Continued)

FOREIGN PATENT DOCUMENTS

| | | |
|---|---|---|
| CZ | 20080391 A3 | 12/2009 |
| EP | 1753034 A2 | 2/2007 |

(Continued)

*Primary Examiner* — Golam Mowla
(74) *Attorney, Agent, or Firm* — Wilson Sonsini Goodrich & Rosati

(57) ABSTRACT

Described herein are solar energy collection systems, devices, and methods for harvesting solar energy. In some embodiments, the devices, systems, and methods described herein comprise a bifacial photovoltaic module, a reflector, a rod and a support structure.

20 Claims, 8 Drawing Sheets

(56) References Cited

U.S. PATENT DOCUMENTS

2014/0026943 A1 1/2014 Wares et al.
2014/0230894 A1 8/2014 Scheulov
2014/0332054 A1 11/2014 Ambrosetti et al.

FOREIGN PATENT DOCUMENTS

| KR | 100799520 B1 | 1/2008 |
|----|--------------|--------|
| WO | WO-2011014688 A2 | 2/2011 |
| WO | WO-2013130448 A1 | 9/2013 |
| WO | WO-2014119055 A1 | 8/2014 |

SOLAR MODULE SUPPORT STRUCTURE

CROSS-REFERENCE

This application claims the benefit of U.S. Provisional Application No. 62/213,073, filed on Sep. 1, 2015, which application is incorporated herein by reference.

BACKGROUND

Harvesting solar energy with solar modules is a clean and renewable means of power generation with increasingly widespread use in homes, businesses, governmental organizations, Utilities and Independent Power Producers (IPP's). Solar modules are comprised of an array of solar cells which collect light energy (photons) from the sun to generate electricity through the photovoltaic effect. In many cases, the fixed or variable orientation of the solar panels, relative to the position of the sun, is optimized to harvest maximum daylight and solar energy.

SUMMARY

Unlike conventional solar panels or modules, bifacial modules convert sunlight on both the top side and bottom side. Bifacial modules are typically expected to receive about 5 to 20% more light from diffuse reflection of bright surfaces, such as a white rooftop, when mounted in a typical fixed tilt manner. Recent improvement in bifacial modules can accommodate 95% of the top surface rating on the backside. That is to say, a bifacial module with full sunlight on both sides can produce 195% of its top side power rating. In the past, bifacial modules had a large price premium so they were not economical for widespread use. However, manufacturing costs for these modules are dropping to levels where it becomes possible to outperform fixed-tilt and other tracker arrangements.

Using low cost reflectors to direct sunlight onto a module to boost the modules output is a form of concentrated photovoltaics (CPV). Conventional bifacial solar modules need uniform radiation to operate optimally. The manner in which these modules are constructed leads to the negative effects of shading being magnified. For example, a 10% shaded module may degrade module performance by up to 40%. The same is true for uneven boosting or concentration, that is uneven areas of radiation lead to a module not performing up to its full potential when compared to being fully and evenly boosted. An oversimplified explanation is that the solar cells of a module are wired in series so that the "weakest" cell acts as a choke point for energy moving through the module. Therefore there is a need for a device that provides for even light distribution onto both the front and rear sides of a bifacial module.

Described herein are solar energy collection systems, devices, and methods for harvesting solar energy. In some embodiments, the devices, systems, and methods described herein comprise a bifacial photovoltaic module, a reflector, a rod and a support structure.

In some embodiments, the devices, systems, and methods described herein comprise a support structure which couples to one or more photovoltaic modules and one or more reflectors.

In some embodiments, the devices, systems, and methods described herein further comprise a solar tracker which detects or calculates the position of a solar energy source and adjusts the position of the solar energy collection system with respect to the solar energy source.

Described herein is a solar energy collection system for harvesting solar energy comprising: a bifacial photovoltaic module having a first photovoltaic surface and a second photovoltaic surface; a first reflector having a first reflective surface; a second reflector having a second reflective surface; and a support structure comprising a rod having a longitudinal axis about which the support structure rotates, the support structure further comprising a first arm and a second arm; wherein the support structure couples to the bifacial photovoltaic module, the first reflector, and the second reflector; wherein the bifacial photovoltaic module couples to the rod of the support structure and is positioned essentially horizontally relative to an outer surface of the rod so that the first photovoltaic surface faces away from the outer surface of the rod and the second photovoltaic surface faces towards the outer surface of the rod; wherein the first reflector and the second reflector respectively couple to the first and the second arm of the support structure and are positioned so that they each face both a solar energy source and the second photovoltaic surface of the bifacial photovoltaic module thus reflecting solar energy from a solar energy source to the second photovoltaic surface. In some embodiments, the solar energy collection system comprises a tracking system configured to independently rotate the bifacial photovoltaic module and the first and the second reflector about the central longitudinal axis of the rod in response to a sensed or calculated position of a solar energy source. In some embodiments, the first and the second reflector are specular reflectors configured to reflect non-diffuse light onto the second photovoltaic surface of the bifacial photovoltaic module. In some embodiments, the first arm and the second arm project from the rod of the support structure and away from the bifacial photovoltaic module. In some embodiments, the first arm and the second arm each form an elbow bend along their respective lengths. In some embodiments, the first arm and the second arm are rotatably coupled with the rod so that they are configured to rotate about the rod as the rod remains in a fixed position. In some embodiments, the first reflector is positioned horizontally to the first arm and the second reflector is positioned horizontally to the second arm. In some embodiments, wherein the first photovoltaic surface of the bifacial photovoltaic module faces towards a solar energy source and the second photovoltaic surface of the bifacial photovoltaic module faces away from the solar energy source. In some embodiments, the support structure is configured so that it does not shade the first reflector, the second reflector, and the bifacial photovoltaic module. In some embodiments, the first reflector and the second reflector are curved.

Also described herein is a solar energy collection system comprising: a bifacial photovoltaic module having an upper surface that faces towards a solar energy source and a lower surface that faces away from a solar energy source; a reflector having a reflective surface; a solar tracker that tracks a position of the solar energy source; a support structure comprising: a base having a first end and a second end, wherein the first end couples with the photovoltaic module and the second end couples with the reflector so that the upper surface of the photovoltaic module faces a solar energy source and the reflective surface of the reflector faces both the solar energy source and the lower surface of the photovoltaic module; and a rod having a central longitudinal axis about which the base rotates thus changing a position of the photovoltaic module and the reflector with respect to the solar energy source in response to a change in the position of the solar energy source that is tracked by the solar tracker. In some embodiments, the reflector is a specular reflector. In some embodiments, one or both of the photovoltaic module and the reflector are configured to movably coupled with the base so that they move independently of the base. In some embodiments, the photovoltaic module and the reflector are fixedly coupled to the base. In some embodiments, the base comprises a frame at the first end of the base that is configured to receive the bifacial photovoltaic module without covering any part of either the upper or the lower surface. In some embodiments, the solar tracker is configured to cause the base to rotate about the central longitudinal axis of the rod in response to the position of the solar energy source with respect to the solar energy collection system thus changing a position of the bifacial photovoltaic module and the reflector with respect to the solar energy source. In some embodiments, the solar tracker comprises an actuator configured to rotate the supporting structure about the rod.

Also described herein is a solar energy collection system comprising: a bifacial photovoltaic module having a first photovoltaic surface and a second photovoltaic surface; a first reflector having a first reflective surface and a second reflector having a second reflective surface; and a support structure comprising a rod having a central longitudinal axis; wherein the bifacial photovoltaic module, the first reflector, and the second reflector are coupled with the rod so that the bifacial photovoltaic module is positioned in between the first reflector and the second reflector, the first reflective surface is positioned opposite the first photovoltaic surface, and the second reflective surface is positioned opposite the second photovoltaic surface; and wherein the bifacial photovoltaic module, the first reflector, and the second reflector are configured to rotate about the central longitudinal axis of the rod. In some embodiments, the bifacial photovoltaic module, the first reflector, and the second reflector are all configured to rotate independently about the central longitudinal axis of the rod. In some embodiments, the first reflector and the second reflector are fixedly coupled to the rod so that the position of the first reflector and the position of the second reflector are fixed. In some embodiments, the first reflector is fixedly coupled to the rod so that the position of the first reflector is fixed. In some embodiments, the position of the first reflector and the position of the second reflector are separated by an angle of up to 180 degrees so that the bifacial photovoltaic module is configured to rotate up to 180 degrees about the rod. In some embodiments, the position of the first reflector and the position of the second reflector are separated by an angle of up to 120 degrees so that the bifacial photovoltaic module is configured to rotate up to 120 degrees about the rod. In some embodiments, the position of the first reflector and the position of the second reflector are separated by an angle of up to 90 degrees so that the bifacial photovoltaic module is configured to rotate up to 90 degrees about the rod. In some embodiments, the first and the second reflector are configured to rotate so that the first reflector covers the first photovoltaic surface of the bifacial photovoltaic module and the second reflector covers the second photovoltaic surface of the bifacial photovoltaic module. In some embodiments, the solar energy collection system additionally comprises a tracking system configured to rotate the bifacial photovoltaic module and the first and the second reflector about the central longitudinal axis of the rod. In some embodiments, the first and the second reflector are specular reflectors.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1A shows a perspective view of the embodiment of a solar energy collection system. FIG. 1B shows a front view of the embodiment of a solar energy collection system.

FIG. 2A shows a perspective view of the solar energy collection system. FIG. 2B shows a front view of the solar energy collection system.

DETAILED DESCRIPTION

Figure 1A:
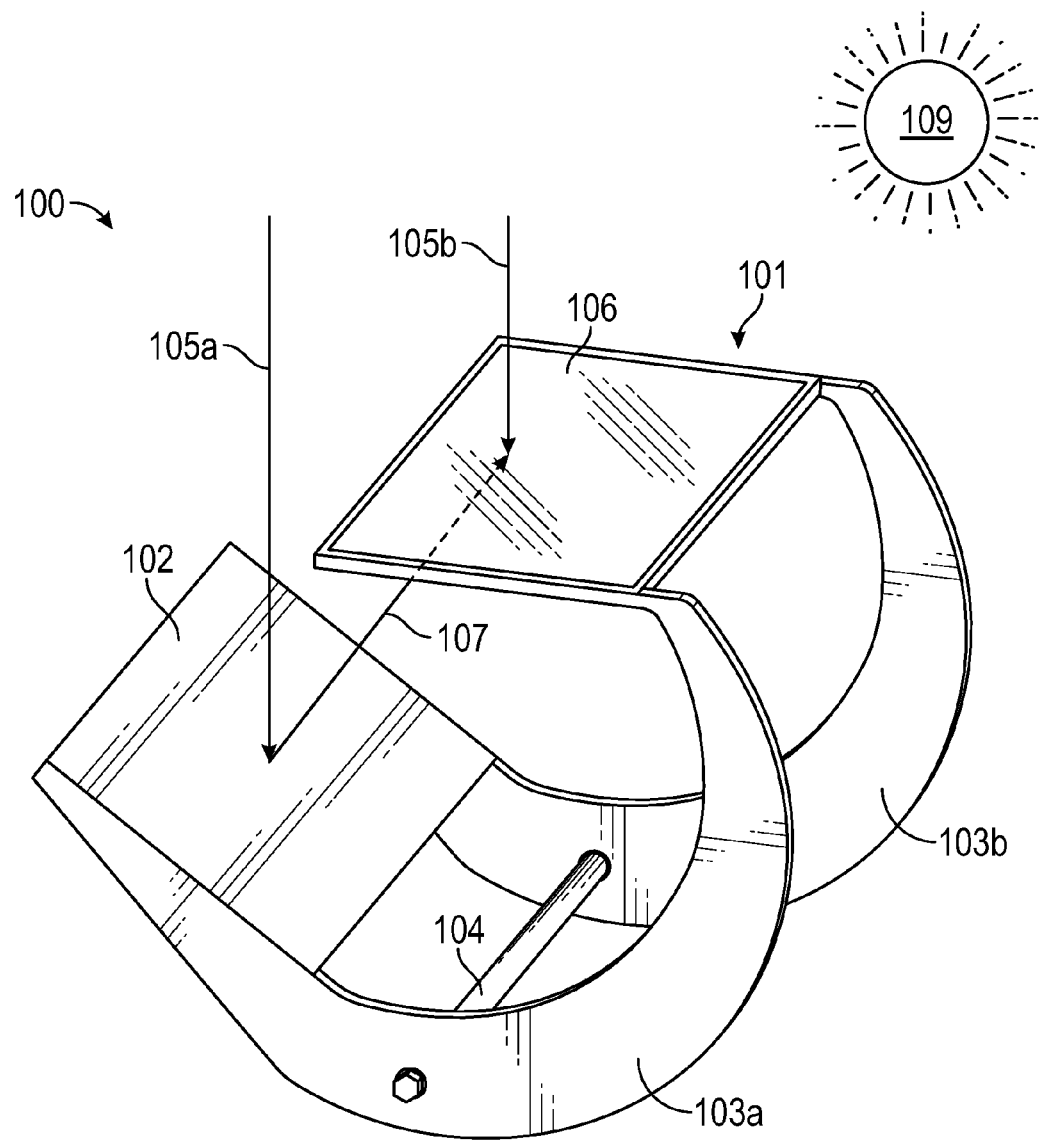
FIGS. 1A-1B show an embodiment of a solar unit having one bifacial photovoltaic module and one reflector, wherein the bifacial photovoltaic module is positioned above the reflector.

Described herein are devices, methods, and systems for harvesting solar energy.

As used herein, a "solar energy source" includes the sun and any other equivalent source of radiant light.

As used herein, a "rod" is a component of the systems, devices, and methods described herein that has a number of equivalents that are suitable for use with systems, devices, and methods described herein that would function exactly as a rod would. In addition, there are a number of industry specific terms for this component that are to be understood as included in the meaning of the term "rod." As such, as used herein, the term "rod" also describes any of a "shaft," a "torque tube," a "tube," a "spine," or a "backbone."

As used herein the terms "active components" or "active component" are used to denote in, a non-limiting manner, one or more of one or more bifacial photovoltaic modules and one or more reflectors.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees, 0.08 degrees, 0.07 degrees, 0.06 degrees, 0.05 degrees, 0.04 degrees, 0.03 degrees, 0.02 degrees or 0.01 degrees of a given value or range.

Bifacial Solar Panel

In some embodiments of the devices, systems, and methods described, the devices, systems, and methods comprise a bifacial photovoltaic module configured to convert solar energy from a solar energy source to electricity. A bifacial photovoltaic module is typically a flat panel having one or more bifacial photovoltaic cells.

Typically, the bifaciality of a module is the percentage of energy that can be harvested from the backside of the module. Bifacial modules typically have a clear backsheet made of glass or fluoropolymers. Many of the current generation of high-volume manufactured bifacial modules have a bifaciality over 85%. This much higher percentage of bifaciality is a prime driver for the apparatus embodiments ability to reduce the cost of Solar energy.

A typical bifacial photovoltaic module generates electricity through the photovoltaic effect, which may be described as the receiving of light energy, in the form of photons, causing an excitation of electrons within the material of the module so that the electrons are excited to a higher energy state thus generating a separation of charge (i.e. a voltage) and a current when connected to a circuit with a load.

The solar energy input striking a photovoltaic module is typically measured in watts/meter squared. One "Sun" of radiation is equivalent to the industry standard of 1000 watts/meter squared from clear mid-day sky.

In some embodiments, a bifacial photovoltaic module is comprised of a packaged, inter-connected assembly containing an array of one or more photovoltaic cells, and one or more transparent protective covers, which shield the electrical components from mechanical damage and moisture. In some embodiments, photovoltaic cells comprise one or a combination of materials including but not limited to: monocrystalline silicon, polycrystalline silicon, epitaxial silicon, ribbon silicon, mono-like-multi silicon, cadmium telluride, copper indium gallium selenide, a silicon thin film or a gallium arsenide thin film. In some embodiments a solar cell consists of multiple stacked thin films with different band gap energies, to allow electromagnetic radiation absorption over a broader spectrum. In some embodiments, the solar cells in a solar module and the solar modules in a solar unit are connected in series and/or in parallel to provide a desired current and voltage capability.

In some embodiments of the devices, systems, and methods described herein, the devices, systems, and methods comprise a bifacial photovoltaic module having first and second photovoltaic surfaces. In these embodiments, the first and second photovoltaic surfaces are positioned on opposite sides of the bifacial photovoltaic module, and typically the first photovoltaic surface is positioned to face towards a solar energy source and the second photovoltaic surface is positioned to face away from the photovoltaic energy source. As such, typically, the second—away facing—photovoltaic surface receives less direct radiant energy than the first photovoltaic surface and thus the performance of the second photovoltaic surface of the bifacial photovoltaic module is enhanced with, for example, the direction of radiant light onto it by one or more reflectors.

Reflector

A reflector is a device that reflects light radiation. There are many considerations and tradeoffs when selecting a reflector. Reflectivity, specularity, cost, durability, scratch resistance, weight, mounting methods to the tracker (framed or unframed), and the ability to be curved are a few of the considerations. Glass reflectors (mirrors) may be laminated, monolithic, tempered, low iron and of various thicknesses. "Metal" reflectors are of various thicknesses and sometimes laminated to a backing. Reflective films are typically laminated to a backing or a glass layer as a front protector. Many materials and "cores" may serve as a backing. Reflectors can also filter different frequencies of light radiation, typically via interference layers and coatings. Some reduce UV so module degradation is reduced while others reduce IR to reduce module temperatures. Different types of solar photovoltaic cell technologies have different light energy conversion frequency profiles and filters can optimize the useful light received by the cell. Solar reflectors should pass a compliance "hail test" so films and thin metal mirrors need a backing or other support envelope to minimize damage during a hail event. Backing cores and materials also maintain the shape of the reflector. Metal mirrors and most films are "first surface" reflectors so angle of incidence has little effect on their performance. Glass Mirrors are second surface reflectors and at large angles of incidence performance decline can be significant, typically depending on the thickness of the glass.

In some embodiments, a reflector is planar. In some embodiments, a reflector is curved or parabolic and acts as a concentrator. In some embodiments, a concentrator is a device that reflects light to direct more than a single "Sun" of radiation onto a solar module. In some embodiments, a low concentration concentrator (CPV) creates under 20 "Suns" of concentration. In some embodiments, a high concentration concentrator CPV are rated with concentrations of 400 to 1500 "Suns." High concentration embodiments need extremely accurate tracking systems and have very narrow acceptance angles of Direct Normal Radiation (DNI). Lower concentration embodiments need much less accuracy and typically have very wide acceptance angles of DNI.

In some embodiments, a curved reflector provides increased design freedom in the geometry of the support structures of the devices, systems, and methods described herein. Specifically, in these embodiments, a curved reflector facilitates higher levels of concentration to the modules (larger aperture to the solar energy source), facilitates minimizing the size (overall height and/or width) of the support structure, facilitates minimizing the size (overall height and/or width) of the one or more reflectors used, and curved specular reflectors maintain a uniform fill of the module.

In some embodiments a reflector is composed of one or more reflective faces.

In some embodiments a reflector is specular, wherein all received light is reflected at the same angle.

In some embodiments a reflector is diffuse, wherein received light is reflected in a broad range of directions.

Support Structure

In some embodiments a support structure protects and constrains the motion and position of one or more bifacial photovoltaic modules, one or more reflectors, and a rod. In some embodiments the support structure comprises a base which may comprise one or more of arms, support legs, frames, clamps, plates, beams, poles, struts, gussets, fasteners, gaskets, gauges and electrical connectors. In some embodiments the support structure contains means for attaching to a building, tower, structure or to the ground. In some embodiments the support structure is comprised of one or more segments which move relatively to each other, and is additionally comprised of bearings, bushings, gears, slides, linkages, hinges, fasteners, couplings, belts, chains and springs. In some embodiments the support structure is comprised of one or a combination of durable materials including but not limited to: metal, fiberglass, wood, concrete, ceramics, glass and plastic.

In some embodiments, the support structure can include means for a fixed or dynamically adjustable height, to prevent solar modules installed on sloped surfaces from shading each other.

In other embodiments, the support structure can be mobile and additionally comprise one or a combination of transportation means including but not limited to; wheels, slides, rails or sleds.

In some embodiments, a support structure comprises a base unit which may include one or more legs or other projections that attach to or balance the support structure on top of a surface, for example, the ground or a roof top. In some embodiments, a support structure comprises one or more curved legs.

In some embodiments, a support structure comprises one or more arms that are configured to couple with a component of the systems and devices described herein. For example, in some embodiments, a first arm of the support structure is configured to couple with a bifacial photovoltaic module, and a second arm of a support structure is configured to couple with a reflector. In some embodiments, one or more arms have a frame that is configured to receive a component of the devices, systems, and methods described herein without shading a function surface of the component.

In some embodiments, a support structure comprises a rod positioned essentially parallel to a surface upon which the support structure is positioned (e.g. the ground or a roof top). In these embodiments, the rod has a central longitudinal axis. In some embodiments, the support structure is configured so that components of the devices, systems, and methods described herein rotate about the central longitudinal axis of the rod. In some of these embodiments, the rod rotates with the rotating components and in some embodiments the rod is fixed while the components are rotatably coupled to the rod so that they rotate around the fixed rod. In some embodiments, one or more legs and one or more arms of the support structure are coupled to the rod.

Solar Tracker

The majority of the solar energy that is available to the devices, systems, and methods described herein comes to Earth in the form of a direct beam from the sun onto, for example, a first surface of a bifacial photovoltaic module. As such, in some embodiments, a solar unit comprises a solar tracker that is configured to adjust a position of the devices and systems described herein in relation to a position of the sun.

In some embodiments a solar tracker is a device capable of determining the orientation of the sun with respect to one or more bifacial photovoltaic modules, and adjusting the position of one or more bifacial photovoltaic modules to optimize the quantity of harvested solar energy. In some embodiments a solar tracker comprises one or more of a manual tracker, a passive tracker, a chronological tracker, and an active tracker.

In some embodiments, a manual tracker is a means of solar unit adjustment that allows a technician to physically translate or rotate one or more solar units towards the sun to maximize the amount of harvested solar energy. In some embodiments, the means of adjustment for manual tracking comprises one or more tuning and setting components including but not limited to: fasteners, knobs, hand wheels, pulleys, racks and pinions, timing belts, chains and sprockets, couplings, clutches, gears, actuator and slides.

In some embodiments, a passive tracker is a non-precision orientation mechanism comprising a fluid or gas which expands under solar heat and directly, mechanically rotates one or more solar units. In some embodiments a passive tracker is a non-precision orientation mechanism comprising a hologram layer within one or more of the photovoltaic modules which can inherently and automatically reflect sunlight at the correct angle towards the cells.

In some embodiments, a chronological solar tracker is comprised of one or more actuators and a controller. In some embodiments a controller contains a chronological tracking algorithm which dictates a constant daytime solar unit angular velocity, equal to the Earth's relative velocity around the sun of about 15 degrees per hour, and then specifies a set angular position that the solar units should return to before the next day. In other, more accurate embodiments, the chronological tracking algorithm is additionally programmed to account for the relationship between the sun's varying relative speed throughout the year, and the geographical location of each solar unit. In some embodiments, the geographical location of the solar unit is manually entered into the algorithm. In some embodiments, the controller commands the actuators to rotate one or more solar units about the rod's central longitudinal axis. In other embodiments, the chronological solar tracker includes one or more locally positioned GPS receivers, which are attached to, and are capable of automatically and accurately measuring the geographical location of, one or more solar units. In some embodiments the GPS measured data is communicated to a controller, to serve as an input for its chronological tracking algorithm.

In some embodiments an active tracker is composed of one or more actuators, a controller and two or more sets of omnidirectionally positioned photosensors, which measure the quantity of radiation power on a surface. In some embodiments the controller contains an active tracking algorithm which computes the optimal position of one or more solar units by comparing the measured light power values to continually determine the direction of a light source. In some embodiments, the controller commands one or more of the actuators to rotate one or more solar units about the central longitudinal axis of the rod based on the calculations performed by the active tracking algorithm.

In some embodiments, the active tracker's controller measures the amount of solar power harvested by one or more solar units and, in some embodiments, additionally comprises a machine learning algorithm which is capable of calculating the optimal position of one or more of the solar units based off the measured.

In some embodiments a controller may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, a controller can comprise a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, such as a Programmable Logic Controller (PLC), a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, or any other suitable form of storage medium known in the art. An exemplary storage medium is coupled to the processor such the processor can read information from, and write information to, the storage medium. In the alternative, the storage medium may be integral to the processor. The processor and the storage medium may reside in an ASIC.

Algorithm

In some embodiments, the controller comprises at least one algorithm or computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Solar tracking devices when installed are usually arranged in groups, clusters or rows. Early morning and late afternoon Direct Normal Irradiation (DNI) from the Sun will eventually cause the trackers to cast shadows onto adjacent trackers. In order to optimize the negative effects of partially shaded modules, trackers commonly use backtracking algorithms to minimize module shading, at the disadvantage of no longer having the module orthogonally facing the Sun. This is because the shading effects usually outweigh loss of overall radiation striking the module.

For a tracker using bifacial modules that are boosted with reflectors, new set of variables is introduced that require new backtracking algorithms to optimize the net output of the tracking device. The variables need to optimize the shading effects of the front side of the modules while considering the shading of the backside of the module via its associated reflector. Additionally, reflectors primarily reflect beam radiation or DNI to the module and the amount of diffuse light from cloudy skies (other atmospheric effects) is another viable to be considered in a boosted bifacial backtracking algorithm. The geometry of each embodiment herein will dictate a unique algorithm. In some embodiments, the tracker may even alter its normal "mid day" (not early or late) tracking algorithm based on the degree of diffuse light occurring.

Actuator

In some embodiments, a actuator is a device which converts one or more forms of energy into linear or rotary motion. In some embodiments, the actuator comprises a heat engine, an electric actuator, a hydraulic actuator or a pneumatic actuator.

In some embodiments an electric actuator is powered by one or more current sources including but not limited to: direct current (DC) sources and alternating current (AC) sources.

In some embodiments the actuator additionally employs transmission means comprising slewing drives, racks and pinions, timing belts, chains and sprockets, couplings, clutches and gears.

In alternative embodiments, of one or more of the actuators are solenoids.

Solar Energy Collection System

Figure 1B:
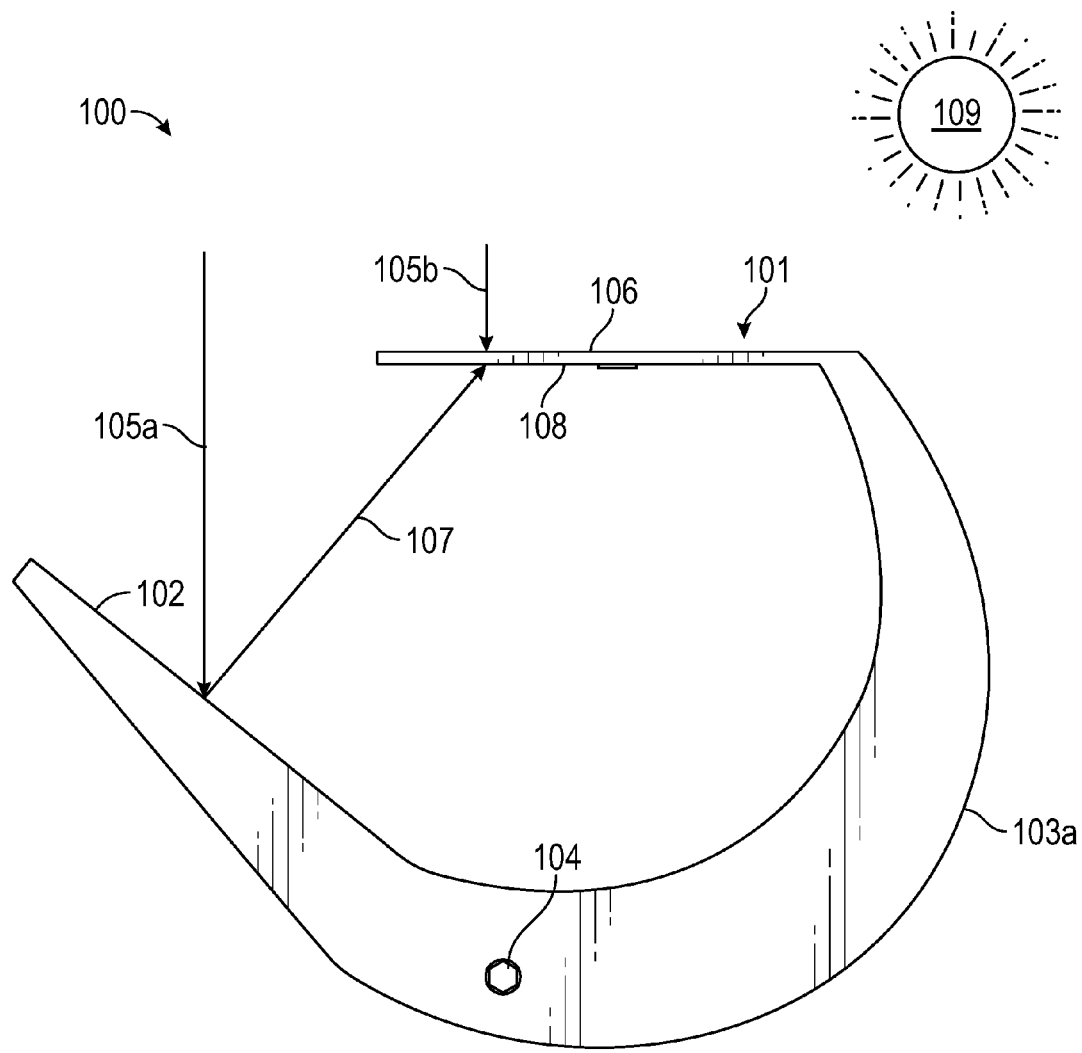

FIGS. 1A and 1B show multiple views of an exemplary embodiment of a solar energy collection system 100. FIG. 1A shows a perspective view of the solar energy collection system 100. FIG. 1B shows a front view of the solar energy collection system 100.

In these embodiments, a solar energy collection system 100 comprises a bifacial photovoltaic module 101, a reflector 102, a first support structure arm 103a, a second support structure arm 103b, and a rod 104. The bifacial photovoltaic module 101, reflector 102, first and second support structure arms 103a and 103b, and the rod 104 may possess any one or more of the features respectively described herein. Though not shown in FIGS. 1A and 1B it will be understood by those having skill in the art that in some embodiments, the solar energy collection system 100 of FIGS. 1A and 1B is further combined with one or more of a solar tracker, an algorithm, and an actuator as described elsewhere herein.

A bifacial photovoltaic module 101 has a first photovoltaic surface 106 positioned to face away from the rod 104, while the second photovoltaic surface is positioned to face towards the rod 104. More specifically, rod 104 has an outer surface which the first photovoltaic surface 106 faces away from while the second photovoltaic surface 108 faces towards the rod 104. As such, the first photovoltaic surface 106 is always facing outwards relative to the solar energy collection system 100, and is thus positioned to receiving direct solar energy from a solar energy source 109.

Direct radiant solar energy 105b is received by the first photovoltaic surface 106 which is positioned to face towards a solar energy source 109 so that rays of light reach the surface of the first photovoltaic surface 106 directly. Direct radiant solar energy 105a is also received by reflective surface 102 and reflected as radiant solar energy 107. Reflective surface 102 is positioned to at least partially face a solar energy source 109 in the solar energy collection system 100. Radiant solar energy 107 is received by the second photovoltaic surface 108 primarily in an indirect fashion, because the second photovoltaic surface 108 is positioned to face towards the rod 104 and thus is positioned away from a solar energy source 109. The reflector 102 is positioned to reflect direct solar energy 105a, in the form of a light beam, onto the surface of the second photovoltaic surface.

In some embodiments, a reflector 102 is a specular reflector so that solar energy 107, in the form of a light beam, is reflected away from the reflector 102 in a single uniform direction as opposed to a diffuse reflection. This feature, of uniform reflection, is beneficial at least in that it prevents dissipation of solar energy through diffusion when a direct solar energy light beam is reflected as radiant solar energy 107 toward the second photovoltaic surface.

In some embodiments, a support structure for holding and positioning the components of the solar energy collection system 100 comprises a base. In some embodiments, a base comprises a first arm 103a and a second arm 103b. However, it will be understood by those having ordinary skill in the art that a base as described herein comprising a single arm 103 or alternatively more than two arms will be suitable for use in the solar energy collection system 100 described herein without departing from these inventive concepts. Specular reflection also allows the energy gain of the first photovoltaic surface 106 by tracking the solar energy source 109, to also be gained by the second photovoltaic surface 108.

In the embodiments shown in FIGS. 1A and 1B, a base comprises a first end a second end, and likewise the first arm 103a and the second arm 103b of the base also comprise a first end and a second end.

In some embodiments, the first end of the base forms a first frame configured to fit around the bifacial photovoltaic module 101 without shading either the first photovoltaic surface 106 or the second photovoltaic surface 108 at the point of coupling, and the second end of the base is configured to receive the reflector 102. In some embodiments, the second end of the base comprises a frame configured to fit the reflector 102 so that the support structure does not shade the reflector 102.

In some embodiments, a first arm 103a and a second arm 103b have a curved shape so that as the support structure rotates the reflector 102 and the bifacial photovoltaic reflector travel in an approximation of an arc of a circle.

A support structure may further comprise one or more legs (not shown) that couple to the base and are configured to secure the base to a surface such as, for example, the ground or a roof. In some embodiments, the base directly contacts a surface upon which it is positioned at least partially. In this embodiment, the base is configured so that it rotates along the surface on which it rests. An exemplary embodiment of a solar energy collection system 100 with a base configured to rotate on a surface on which it is placed is shown in FIGS. 1A and 1B.

In some embodiments, the support structure comprises a rod 104 having a central longitudinal axis. The rod 104 is positioned so that at least a portion of the solar energy collection system 100 rotates about the central longitudinal axis of the rod 104 in order, for example, to change a position of one or more of the bifacial photovoltaic module 101 or the reflector 102. For example, in some embodiments, rotation of the solar energy collection system 100 comprises a rotation of the bifacial photovoltaic module 101 so that the first photovoltaic surface 105 tracks the movement of the sun 109. For example, in some embodiments, rotation of the solar energy collection system 100 comprise rotation of the reflector, which rotates so that it is positioned at least partially facing towards the sun 109 and at least partially facing towards the second photovoltaic surface 108 in order to increase the amount of solar energy reflected onto the second photovoltaic surface 108 with a change in position of the sun 109 and/or the second photovoltaic surface 108.

In general, the components of the support structure are arranged so that the active components of the solar energy system, when coupled to the support structure, are not shaded by any aspect of the support structure.

In some embodiments, a rod 104 is coupled to one or more components of the solar energy collection system 100. In some embodiments, a rod 104 is positioned essentially horizontally to the surface upon which the solar energy collection system 100 rests and couples with the base at the first and second arms 103a and 103b. In some embodiments, one or more components of the solar energy collection system 100 rotatably couple to the rod 104 so that they rotate about the central longitudinal axis of the rod 104 during operation of the system 100 while the position of the rod 104 is fixed. In some embodiments, one or more components of the solar energy collection system 100 are coupled to the rod 104 so that a rotation of the rod 104 causes the one or more coupled components to rotate about the central longitudinal axis of the rod 104. In some embodiments, the rod 104 (or alternatively one or more individual components) is caused to rotate about the central longitudinal axis of the rod 104 by the actions of an actuator (not shown).

Figure 2A:
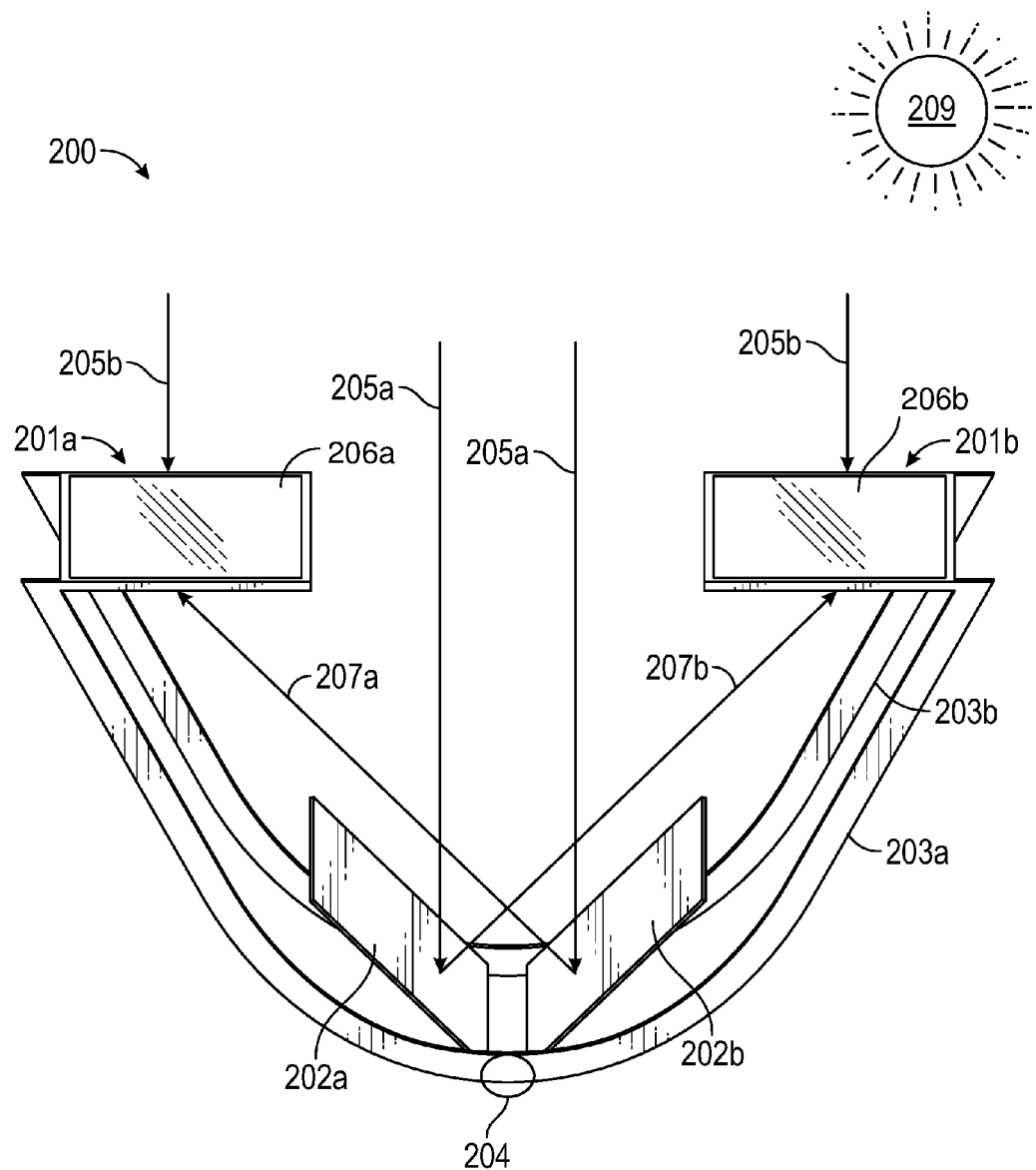
FIGS. 2A and 2B show multiple views of an exemplary embodiment of a solar energy collection system.
Figure 2B:
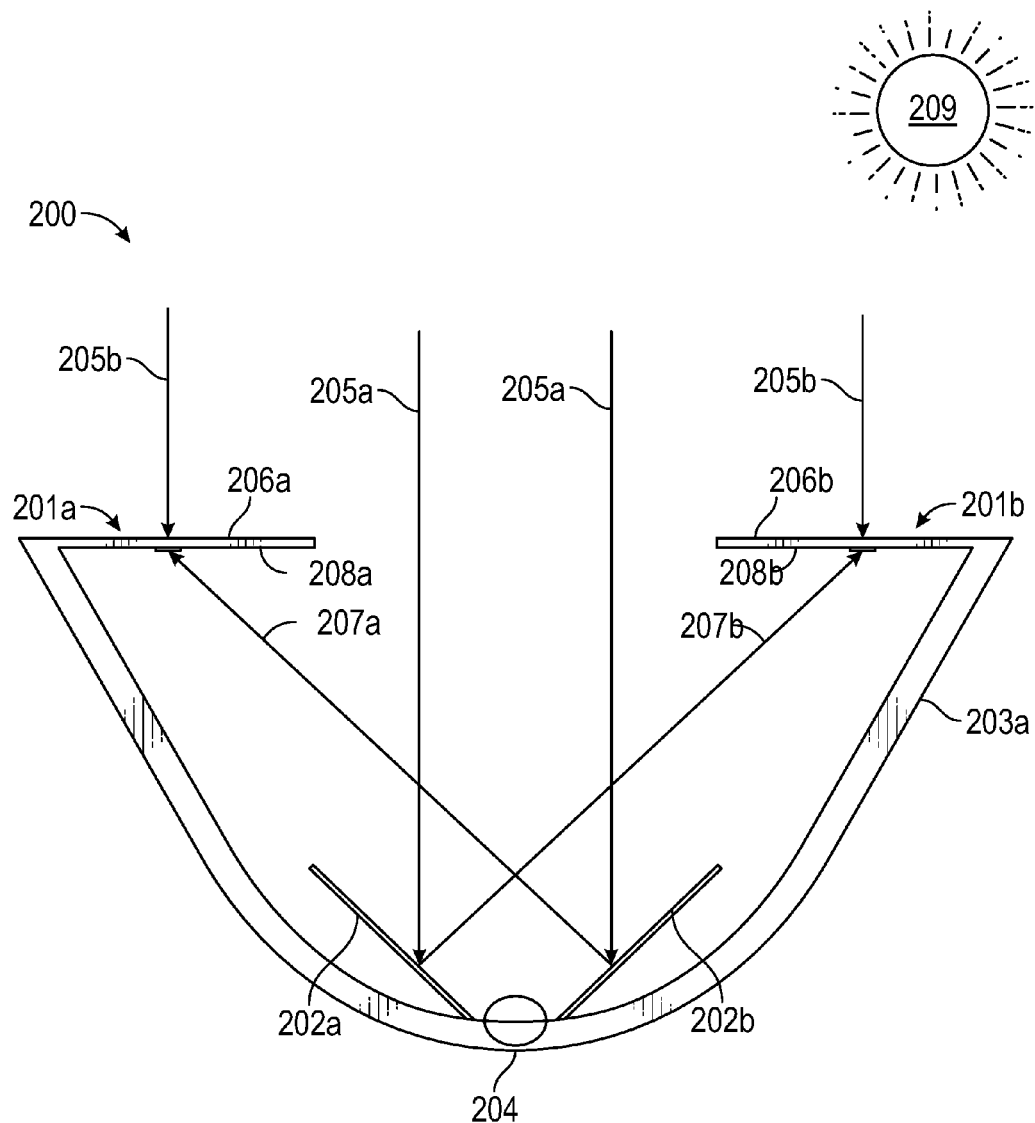

FIGS. 2A and 2B show multiple views of an exemplary embodiment of a solar energy collection system 200. FIG. 2A shows a perspective view of the solar energy collection system 200. FIG. 2B shows a front view of the solar energy collection system 200.

A solar energy collection system 200 comprises a first bifacial photovoltaic module 201a, a second bifacial photovoltaic module 201b, a first reflector 202a, a second reflector 202b, a first support structure arm 203a, a second support structure arm 203b, and a rod 204. The first and second bifacial photovoltaic modules 201a and 201b, the first and second reflectors 202a and 202b, the first and second support structure arms 203a and 203b, and the rod 204 may possess any one or more of the features respectively described herein. Though not shown in FIGS. 2A and 2B it will be understood by those having skill in the art that in some embodiments, the solar energy collection system 200 of FIGS. 2A and 2B is further combined with one or more of a solar tracker, an algorithm, and an actuator as described elsewhere herein.

Each bifacial photovoltaic module 201a and 201b have a first photovoltaic surface 205 positioned to face away from the rod 204, while each also has a second photovoltaic surface that is positioned to face towards the rod 204. More specifically, rod 204 has an outer surface which each of the first photovoltaic surfaces 206a and 206b face away from, while each of the second photovoltaic surfaces 208a and 208b face towards the rod 204. As such, each of the first photovoltaic surfaces 206a and 206b are always facing outwards relative to the solar energy collection system 200, and is thus positioned to receiving direct solar energy from a solar energy source 209.

Direct radiant solar energy 205b is received by each of the first photovoltaic surfaces 206a and 206b which are positioned to face towards a solar energy source 209 so that rays of light reach the surface of the first photovoltaic surfaces 206a and 206b directly. Direct radiant solar energy 205a is also received by reflective surface 202 and reflected as radiant solar energy 207. Both reflectors 202a and 202b are positioned to at least partially face a solar energy source 209. Radiant solar energy 207 is received by the second photovoltaic surface 208 primarily in an indirect fashion, because the second photovoltaic surface 208 is positioned to face towards the rod 204 and thus is positioned away from a solar energy source 209. The reflector 202 is positioned to reflect direct solar energy 207, in form of a light beam, onto the surface of the second photovoltaic surfaces 208a and 208b.

In some embodiments, a first and second reflector 202a and 202b are specular reflectors so that solar energy 207, in the form of a light beam, is reflected away from each of the reflectors in a single uniform direction as opposed to a diffuse reflection. This feature, of uniform reflection, is beneficial at least in that it prevents dissipation of solar energy through diffusion when a direct solar energy light beam is reflected as radiant solar energy 207 respectively toward each of the second photovoltaic surfaces 208a and 208b. Tracking of the solar energy source 209 in combination with specular reflection additionally enhances the performance of the second photovoltaic surfaces 208a and 208b.

In some embodiments, a support structure for holding and positioning the components of the solar energy collection system 200 comprises a base. In some embodiments, a base comprises a first arm 203a and a second arm 203b. However, it will be understood by those having ordinary skill in the art that a base as described herein comprising a single arm or alternatively more than two arms will be suitable for use in the solar energy collection system 200 described herein without departing from these inventive concepts.

In the embodiments shown in FIGS. 2A and 2B, a base comprises a first end a second end, and likewise the first arm 203a and the second arm 203b of the base also comprise a first end and a second end.

In some embodiments, the first end and the second end of the base each form a first and a second frame configured to fit around each of the bifacial photovoltaic modules 201a and 201b without shading either of the first photovoltaic surfaces 206a and 206b or either of the second photovoltaic surfaces at the point of coupling. The base is configured to receive each of the reflectors 202a and 202b near the rod 204.

In some embodiments, a first arm 203a and a second arm 203b have a curved shape so that as the support structure rotates the reflector 202 and each of the bifacial photovoltaic modules 201a and 201b and reflectors 202a and 202b travel in an approximation of an arc of a circle.

A support structure may further comprise one or more legs (not shown) that couple to the base and are configured to secure the base to a surface such as, for example, the ground or a roof. In some embodiments, the base directly contacts a surface upon which it is positioned at least partially. In this embodiment, the base is configured so that it rotates along the surface on which it rests. An exemplary embodiment of a solar energy collection system 200 with a base configured to rotate on a surface on which it is placed is shown in FIGS. 2A and 2B.

In some embodiments, the support structure comprises a rod 204 having a central longitudinal axis. The rod 204 is positioned so that at least a portion of the solar energy collection system 200 rotates about the central longitudinal axis of the rod 204 in order, for example, to change a position of one or more of the first and second bifacial photovoltaic modules 201a and 201b or the first and second reflectors 202a and 202b. For example, in some embodiments, rotation of the solar energy collection system 200 comprises a rotation of the first and second bifacial photovoltaic module 201a and 201b so that each of the first photovoltaic surfaces 206a and 206b track the movement of the sun 209. For example, in some embodiments, each of the reflectors 202a and 202b rotates so that it is positioned relative to the sun 209 and the second photovoltaic surfaces 208a and 208b in order to increase the amount of solar energy reflected onto each of the second photovoltaic surfaces 208a and 208b with a change in position of the sun 209 and/or each of the second photovoltaic surfaces 208a and 208b.

In general, the components of the support structure are arranged so that the active components of the solar energy system, when coupled to the support structure, are not shaded by any aspect of the support structure.

In some embodiments, a rod 204 is coupled to one or more components of the solar energy collection system 200. In some embodiments, a rod 204 is positioned essentially horizontally to the surface upon which the solar energy collection system 200 rests and couples with the base at the first and second arms 203a and 203b. In some embodiments, one or more components of the solar energy collection system 200 rotatably couple to the rod 204 so that they rotate about the central longitudinal axis of the rod 204 during operation of the system while the position of the rod 204 is fixed. In some embodiments, one or more components of the solar energy collection system 200 are coupled to the rod 204 so that a rotation of the rod 204 causes the one or more coupled components to rotate about the central longitudinal axis of the rod. In some embodiments, the rod 204 (or alternatively one or more individual components) is caused to rotate about the central longitudinal axis of the rod by the actions of an actuator (not shown).

Figure 3:
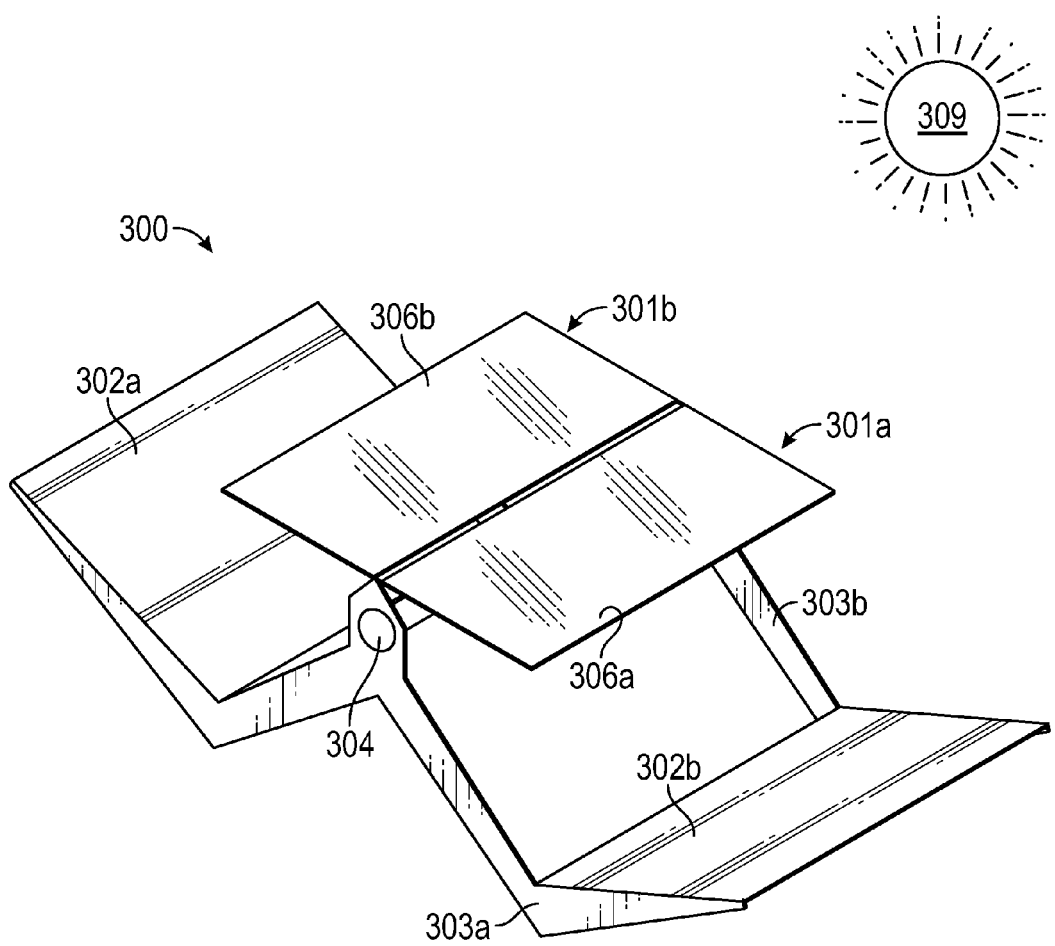
FIG. 3 shows a perspective view of an embodiment of a solar energy collection system.

FIG. 3 shows a perspective view of an embodiment of a solar energy collection system 200.

In this embodiment, a solar energy collection system 300 comprises a first bifacial photovoltaic module 301a, a second bifacial photovoltaic module 302b, a first reflector 302a, a second reflector 302b, a first support structure arm 303a, a second support structure arm 303b, and a rod 304. The first and second bifacial photovoltaic modules 301a and 301b, the first and second reflectors 302a and 302b, the first and second support structure arms 303a and 303b, and the rod 304 may possess any one or more of the features respectively described herein. Though not shown in FIG. 3 it will be understood by those having skill in the art that in some embodiments, the solar energy collection system 300 of FIG. 3 is further combined with one or more of a solar tracker, an algorithm, and an actuator as described elsewhere herein.

Each bifacial photovoltaic module 301a and 301b respectively includes a first photovoltaic surface 306a and 306b and a second surface (not shown). Each respective first photovoltaic surface 306a and 306b is positioned to face away from the rod 304, while each second photovoltaic surface is positioned to face towards the rod 304. More specifically, rod 304 has an outer surface which each first photovoltaic surface 306a and 306b faces away from, while each second photovoltaic surface faces towards the rod 304. As such, each first photovoltaic surface 306a and 306b is always facing outwards relative to the solar energy collection system 300, and is thus positioned to receiving direct solar energy from a solar energy source.

Direct radiant solar energy is received by each first photovoltaic surface 306a and 306b which are positioned to face towards a solar energy source 309 so that rays of light reach the surface of each first photovoltaic surface 306a and 306b directly. Direct radiant solar energy is also received by each reflective surface 302a and 302b and is reflected as radiant solar energy. Both reflectors 302a and 302b are positioned to at least partially face a solar energy source. Radiant solar energy 307 is received by the second photovoltaic surface 308 primarily in an indirect fashion, because each second photovoltaic surface is positioned to face towards the rod 304 and thus is positioned away from a solar energy source. Each of the reflectors 302a and 302b are positioned to reflect direct solar energy, in the form of a light beam, onto the surface of the second photovoltaic surface.

In some embodiments, a first and second reflector 302a and 302b are specular reflectors so that solar energy, in the form of a light beam, is reflected away from each of the reflectors in a single uniform direction as opposed to a diffuse reflection. This feature, of uniform reflection, is beneficial at least in that it prevents dissipation of solar energy through diffusion when a direct solar energy light beam is reflected as radiant solar energy respectively toward each of the second photovoltaic surface. Tracking of the solar energy source in combination with specular reflection additionally enhances the performance of the second photovoltaic surface 308.

In some embodiments, a support structure for holding and positioning the components of the solar energy collection system 300 comprises a base. In some embodiments, a base comprises a first arm 303a and a second arm 303b. However, it will be understood by those having ordinary skill in the art that a base as described herein comprising a single arm or alternatively more than two arms will be suitable for use in the solar energy collection system 300 described herein without departing from these inventive concepts.

In the embodiments shown in FIG. 3, a base comprises a first end a second end, and likewise the first arm 303a and the second arm 303b of the base also comprise a first end and a second end.

In some embodiments, the first end and the second end of the base each are configured to respectively receive a first and second reflector 302a and 302b. In some embodiments, each bifacial photovoltaic module 301a and 301b couples directly to the rod 304. In some embodiments, each bifacial photovoltaic module 301a and 301b couples to the rod 304 via a coupler, a frame, or one or more arms.

In some embodiments, a first arm 303a and a second arm 303b form a "W" shape, so that first and second reflectors 302a and 302b are positioned to at least partially face towards a solar energy source 309 and at least partially face towards the second photovoltaic surface of the bifacial photovoltaic module.

A support structure may further comprise one or more legs (not shown) that couple to the base and are configured to secure the base to a surface such as, for example, the ground or a roof. In some embodiments, the base directly contacts a surface upon which it is positioned at least partially. In this embodiment, the base is configured so that it rotates along the surface on which it rests. An exemplary embodiment of a solar energy collection system 300 with a base configured to rotate on a surface on which it is placed is shown in FIG. 3.

In some embodiments, the support structure comprises a rod 304 having a central longitudinal axis. The rod 304 is positioned so that at least a portion of the solar energy collection system 300 rotates about the central longitudinal axis of the rod in order to, for example, change a position of the bifacial photovoltaic modules 301a and 301b and/or the reflectors 302a and 302b. For example, in some embodiments, rotation of the solar energy collection system 300 comprises a rotation of the bifacial photovoltaic module 301a so that the first photovoltaic surface 306a tracks the movement of the sun 309. For example, in some embodiments, the reflector 302a rotates so that it is positioned relative to the sun 309 and the second photovoltaic surface in order to increase the amount of solar energy reflected onto the second photovoltaic surface with a change in position of the sun and/or the second photovoltaic surface. In some embodiments both bifacial photovoltaic modules 301a and 301b rotate together. In some embodiments, both reflectors 302a and 302b rotate together. In some embodiments, both photovoltaic modules 301a and 301b and both reflectors 302a and 302b rotate together.

In general, the components of the support structure are arranged so that the active components of the solar energy system, when coupled to the support structure, are not shaded by any aspect of the support structure.

In some embodiments, a rod 304 is coupled to one or more components of the solar energy collection system 300. In some embodiments, a rod is positioned essentially horizontally to the surface upon which the solar energy collection system 300 rests and couples with the base at the first and second arms 303a and 303b. In some embodiments, one or more components of the solar energy collection system 300 rotatably couple to the rod so that they rotate about the central longitudinal axis of the rod during operation of the system while the position of the rod is fixed. In some embodiments, one or more components of the solar energy collection system 300 are coupled to the rod so that a rotation of the rod causes the one or more coupled components to rotate about the central longitudinal axis of the rod. In some embodiments, one or more photovoltaic solar modules 301a and 301b are coupled to the rod via a frame that is configured to fit around the outer edges of the one or more photovoltaic solar modules 301a and 301b. In these embodiments, the frame is either fixedly or rotatably coupled to the rod 304. The bifacial photovoltaic modules 301a and 301b may couple to the rod so that the first photovoltaic surfaces 306a and 306b and the second surfaces are essentially parallel to a central longitudinal axis of the rod 304, or in some embodiments, either or both bifacial photovoltaic modules 301a and 301b are positioned at an angle relative to the central longitudinal axis of the rod 304. For example, in some embodiments, the bifacial photovoltaic modules 301a and 301b are positioned in a "Y" shape relative to the central longitudinal axis of the rod 304. For example, in some embodiments, the bifacial photovoltaic modules 301a and 301b are positioned in a "V" shape relative to the central longitudinal axis of the rod 304. In some embodiments, the rod (or alternatively one or more individual components) is caused to rotate about the central longitudinal axis of the rod by the actions of an actuator (not shown).

Figure 4A:
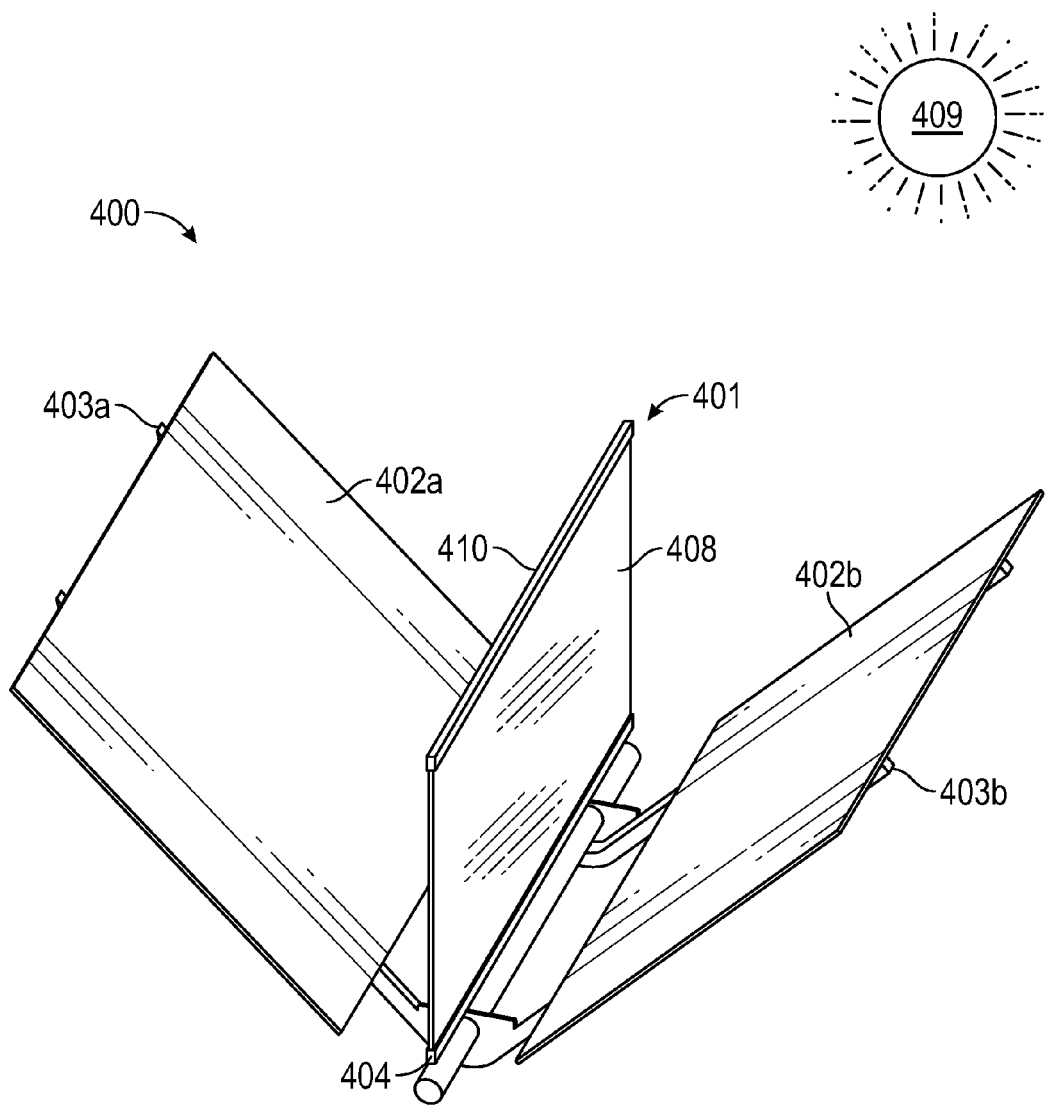
FIGS. 4A-4B show perspective views of an embodiment of a solar energy collection system 400. In this embodiment, a solar energy collection system comprises a first reflector, a second reflector, a bifacial photovoltaic module, a support structure, and a rod.
Figure 4B:
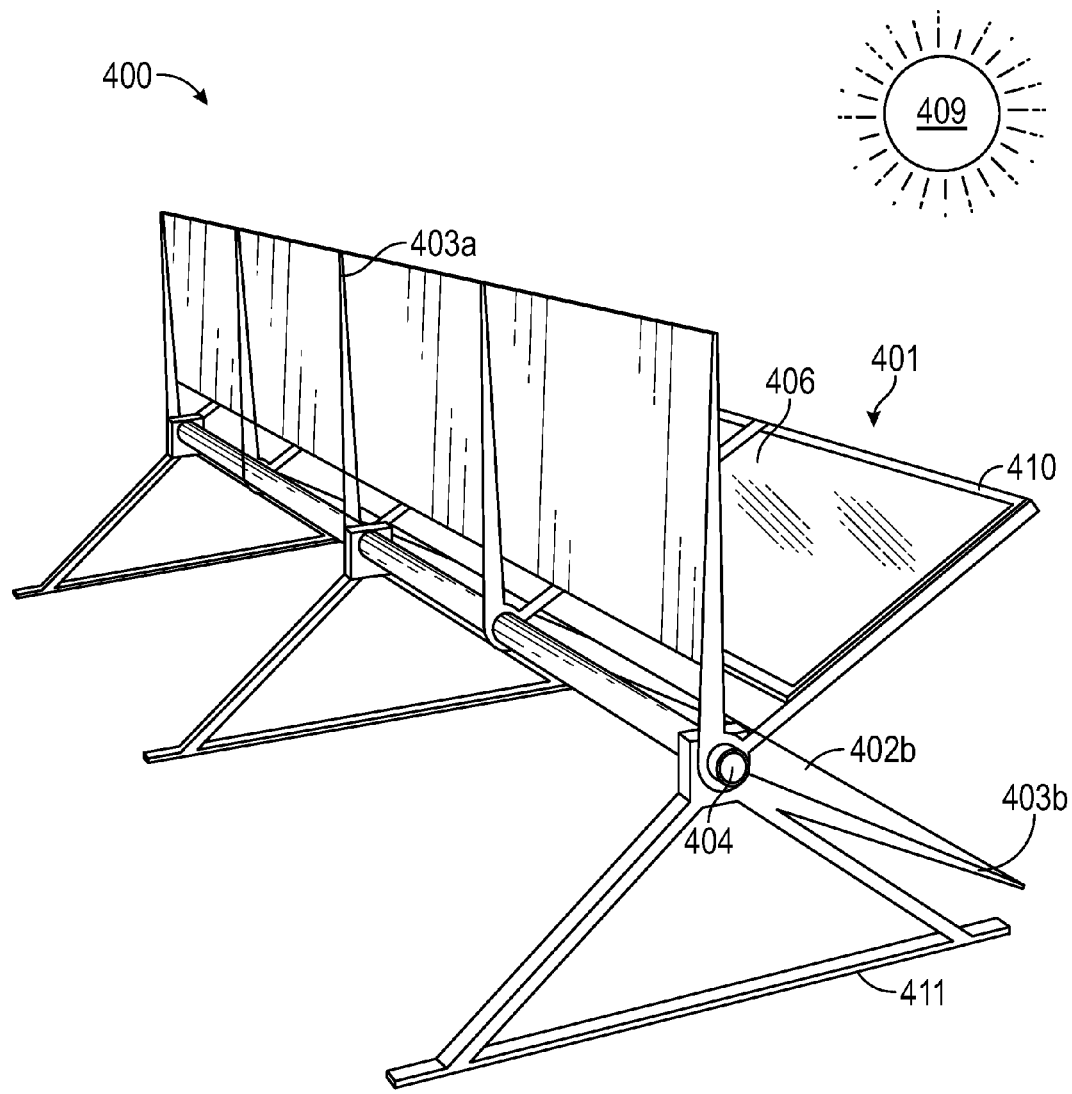

FIGS. 4A-4B show perspective views of an embodiment of a solar energy collection system 400. In this embodiment, a solar energy collection system 400 comprises a first reflector 402a, a second reflector 402b, a bifacial photovoltaic module 401, a support structure 411, and a rod 404.

FIG. 4A shows a view of an embodiment that does not include legs. Shown in FIG. 4A are first and second reflectors 402a and 402b, a rod 404, and a bifacial photovoltaic module 401 positioned between the first and second reflectors 402a and 402b. FIG. 4B shows an embodiments that includes legs for positioning the embodiment of FIG. 4A on a surface such as, for example, the ground or roof top.

In these embodiments, a solar energy collection system 400 comprises a bifacial photovoltaic module 401, a first reflector 402a, a second reflector 402b, a first support structure arm 403a, a second support structure arm 403b, an optional frame 408, and a rod 204. The bifacial photovoltaic module 401, the first and second reflectors 402a and 402b, the first and second support structure arms 403a and 403b, and the rod 404 may possess any one or more of the features respectively described herein. Though not shown in FIGS. 4A and 4B it will be understood by those having skill in the art that in some embodiments, the solar energy collection system 400 of FIGS. 4A and 4B is further combined with one or more of a solar tracker, an algorithm, and an actuator as described elsewhere herein.

The bifacial photovoltaic surface 401 has a first photovoltaic surface 406 and a second photovoltaic surface 408 that are both positioned so that they are perpendicular to the rod 404. More specifically, rod 404 has an outer surface to which the first photovoltaic surface 406 and the second photovoltaic surface 408. As such, the first photovoltaic surface 406 and the second photovoltaic surface 408 partially face towards and away from the solar energy source 409.

Direct radiant solar energy is received by each reflective surface 402a and 402b and is reflected as radiant solar energy onto both the first and second photovoltaic surfaces 406 and 408. Both reflectors 402a and 402b are positioned to at least partially face a solar energy source 409. Each of the reflectors 402a and 402b are positioned to reflect direct solar energy, in the form of a light beam, onto the surface of the first and second photovoltaic surfaces 406 and 408.

In some embodiments, a first and second reflector 402a and 402b are specular reflectors so that solar energy, in the form of a light beam, is reflected away from each of the reflectors in a single uniform direction as opposed to a diffuse reflection. This feature, of uniform reflection, is beneficial at least in that it prevents dissipation of solar energy through diffusion when a direct solar energy light beam is reflected as radiant solar energy respectively toward each of the second photovoltaic surfaces. Tracking of the solar energy source in combination with specular reflection additionally enhances the performance of the first and second photovoltaic surfaces 406 and 408.

In some embodiments, a support structure 411 for holding and positioning the components of the solar energy collection system 400 comprises a base. In some embodiments, a base is configured to couple the first and second reflector 402a, 402b along with the bifacial photovoltaic surface 401 to the rod 404. In some embodiments, a support structure element couples the first and second reflector 402a and 402b along with the bifacial photovoltaic surface 401 to the rod 404. In some embodiments, the first and second reflector 402a and 402b along with the bifacial photovoltaic surface are directly coupled to the rod 404. In some embodiments, the first and second reflector 402a and 402b along with the bifacial photovoltaic surface 401 are rotatably coupled to the rod 404. In some embodiments, a base comprises a first arm 403a and a second arm 403b that are configured to couple one or more active components to the either the base and/or the rod 404.

A support structure 411 may further comprise one or more legs that couple to the base and are configured to secure the base to a surface such as, for example, the ground or a roof. In some embodiments, the base directly contacts a surface upon which it is positioned at least partially. In this embodiment, the base is configured so that it rotates along the surface on which it rests. An exemplary embodiment of a solar energy collection system 400 with a base configured to rotate on a surface on which it is placed is shown in FIG. 4A.

In some embodiments, the support structure 411 comprises a rod 404 having a central longitudinal axis. The rod 404 is positioned so that at least a portion of the solar energy collection system 400 rotates about the central longitudinal axis of the rod 404 in order to, for example, change a position of one or more of the bifacial photovoltaic module 401 and/or the first and/or the second reflectors 402a and 402b. For example, in some embodiments, rotation of the solar energy collection system 400 comprises a rotation of the bifacial photovoltaic module 401 so that the first photovoltaic surface 406 tracks the movement of the sun 409. For example, in some embodiments, a reflector 402b rotates so that it is positioned relative to the sun 409 and the second photovoltaic surface 408 in order to increase the amount of solar energy reflected onto the second photovoltaic surface 408 with a change in position of the sun 409 and/or the second photovoltaic surface 408.

In general, the components of the support structure 411 are arranged so that the active components of the solar energy system, when coupled to the support structure, are not shaded by any aspect of the support structure.

In some embodiments, a rod 404 is coupled to one or more components of the solar energy collection system 400. In some embodiments, a rod 404 is positioned essentially horizontally to the surface upon which the solar energy collection system 400 rests and couples with the base at the first and second arms 403a and 403b. In some embodiments, one or more components of the solar energy collection system 400 rotatably couple to the rod 404 so that they rotate about the central longitudinal axis of the rod during operation of the system while the position of the rod 404 is fixed. In some embodiments, one or more components of the solar energy collection system 400 are coupled to the rod 404 so that a rotation of the rod 404 causes the one or more coupled components to rotate about the central longitudinal axis of the rod 404. In some embodiments, the rod (or alternatively one or more individual components) is caused to rotate about the central longitudinal axis of the rod 404 by the actions of an actuator.

The bifacial photovoltaic module 401 is positioned between the first and second reflectors 402a and 402b. In some embodiments, the solar energy collection system 400 is configured so that the first reflector 402a reflects light onto the first photovoltaic surface 406 of the photovoltaic module 401 and the second reflector 402b reflects light onto the second surface 408 of the photovoltaic module 401. In some embodiments, the position of the first reflector 402a and the second reflector 402b are fixed and the bifacial photovoltaic module 401 is configured to rotate about the central longitudinal axis of the rod 404 between the positions of the first reflector 402a and the second reflector 402b. In some embodiments, the position of the bifacial photovoltaic module 401 is fixed and the first and second reflectors 402a and 402b are configured to rotate about the central horizontal axis of the rod 404 relative to the position of the bifacial photovoltaic module 401. In some embodiments, the first reflector 402a, the second reflector 402b, and the bifacial photovoltaic module 401 are configured to rotate about the central longitudinal axis of the rod 404 independently of each other.

In some embodiments, the first reflector 402a and/or the second reflector 402b are configured to respectively fold onto the first surface and/or the second surface of the bifacial photovoltaic module 401 so that the solar energy collection system 400 nests. When the solar energy collection system 400 nests, the first and second surfaces 406 and 408 of the bifacial photovoltaic module 401 are covered by the reflectors thus protecting the module. This nesting feature is beneficial when the tracker needs to stow for a high wind period. This nesting feature is beneficial, for transporting the solar energy collection system 400 so that the bifacial photovoltaic module 401 is protected and the system is more compact and thus easier to package and transport. This nesting feature is beneficial for installation and rapid deployment at an installation site. This nesting feature is beneficial to reduce installation labor at an installation site.

In some embodiments, an angle between a first reflector 402a and a bifacial photovoltaic module 401 is less than about 180 degrees. In some embodiments, an angle between a first reflector 402a and a bifacial photovoltaic module 401 is less than about 170 degrees. In some embodiments, an angle between a first reflector 402a and a bifacial photovoltaic module 401 is less than about 160 degrees. In some embodiments, an angle between a first reflector 402a and a bifacial photovoltaic module 401 is less than about 150 degrees. In some embodiments, an angle between a first reflector 402a and a bifacial photovoltaic module 401 is less than about 140 degrees. In some embodiments, an angle between a first reflector 402a and a bifacial photovoltaic module 401 is less than about 130 degrees. In some embodiments, an angle between a first reflector 402a and a bifacial photovoltaic module 401 is less than about 120 degrees. In some embodiments, an angle between a first reflector 402a and a bifacial photovoltaic module 401 is less than about 110 degrees. In some embodiments, an angle between a first reflector 402a and a bifacial photovoltaic module 401 is less than about 100 degrees. In some embodiments, an angle between a first reflector 402a and a bifacial photovoltaic module 401 is less than about 90 degrees. In some embodiments, an angle between a first reflector 402a and a bifacial photovoltaic module 401 is less than about 80 degrees. In some embodiments, an angle between a first reflector 402a and a bifacial photovoltaic module 401 is less than about 70 degrees. In some embodiments, an angle between a first reflector 402a and a bifacial photovoltaic module 401 is less than about 60 degrees. In some embodiments, an angle between a first reflector 402a and a bifacial photovoltaic module 401 is less than about 50 degrees. In some embodiments, an angle between a first reflector 402a and a bifacial photovoltaic module 401 is less than about 40 degrees. In some embodiments, an angle between a first reflector 402a and a bifacial photovoltaic module 401 is less than about 30 degrees. In some embodiments, an angle between a first reflector 402a and a bifacial photovoltaic module 401 is less than about 20 degree. In some embodiments, an angle between a first reflector 402a and a bifacial photovoltaic module 401 is less than about 10 degrees. In some embodiments, an angle between a second reflector 402b and a bifacial photovoltaic module 401 is less than about 180 degrees. In some embodiments, an angle between a second reflector 402b and a bifacial photovoltaic module 401 is less than about 170 degrees. In some embodiments, an angle between a second reflector 402b and a bifacial photovoltaic module 401 is less than about 160 degrees. In some embodiments, an angle between a second reflector 402b and a bifacial photovoltaic module 401 is less than about 150 degrees. In some embodiments, an angle between a second reflector 402b and a bifacial photovoltaic module 401 is less than about 140 degrees. In some embodiments, an angle between a second reflector 402b and a bifacial photovoltaic module 401 is less than about 130 degrees. In some embodiments, an angle between a second reflector 402b and a bifacial photovoltaic module 401 is less than about 120 degrees. In some embodiments, an angle between a second reflector 402b and a bifacial photovoltaic module 401 is less than about 110 degrees. In some embodiments, an angle between a second reflector 402b and a bifacial photovoltaic module 401 is less than about 100 degrees. In some embodiments, an angle between a second reflector 402b and a bifacial photovoltaic module 401 is less than about 90 degrees. In some embodiments, an angle between a second reflector 402b and a bifacial photovoltaic module 401 is less than about 80 degrees. In some embodiments, an angle between a second reflector 402b and a bifacial photovoltaic module 401 is less than about 70 degrees. In some embodiments, an angle between a second reflector 402b and a bifacial photovoltaic module 401 is less than about 60 degrees. In some embodiments, an angle between a second reflector 402b and a bifacial photovoltaic module 401 is less than about 50 degrees. In some embodiments, an angle between a second reflector 402b and a bifacial photovoltaic module 401 is less than about 40 degrees. In some embodiments, an angle between a second reflector 402b and a bifacial photovoltaic module 401 is less than about 30 degrees. In some embodiments, an angle between a second reflector 402b and a bifacial photovoltaic module 401 is less than about 20 degree. In some embodiments, an angle between a second reflector 402b and a bifacial photovoltaic module 401 is less than about 10 degrees.

Spring Bearing System

In some embodiments of the systems, devices, and methods described herein, as components such as for example, reflectors and/or bifacial photovoltaic modules rotate about an axis, the change in position of one or more components causes an imbalance in terms of the center of gravity of the device and generates a torque on the support structure.

In some embodiments of the solar energy collection system 400 described herein, the system comprises one or more bearings that provide additional support of the rotating components thus relieving the degree of torque experienced by the system. These bearings are beneficial in that, for example, they allow for use of a rod that is lighter and smaller in diameter and also relieve extra workload from the actuators.

In some embodiments, a bearing comprises a spring. In some embodiments, a bearing comprises a bushing that comprises a spring. Non-limiting examples of spring types suitable for use with the systems, devices, and methods described herein include coil type, torsion type and leaf (also called Bow or semi-elliptical) type.

Figure 5:
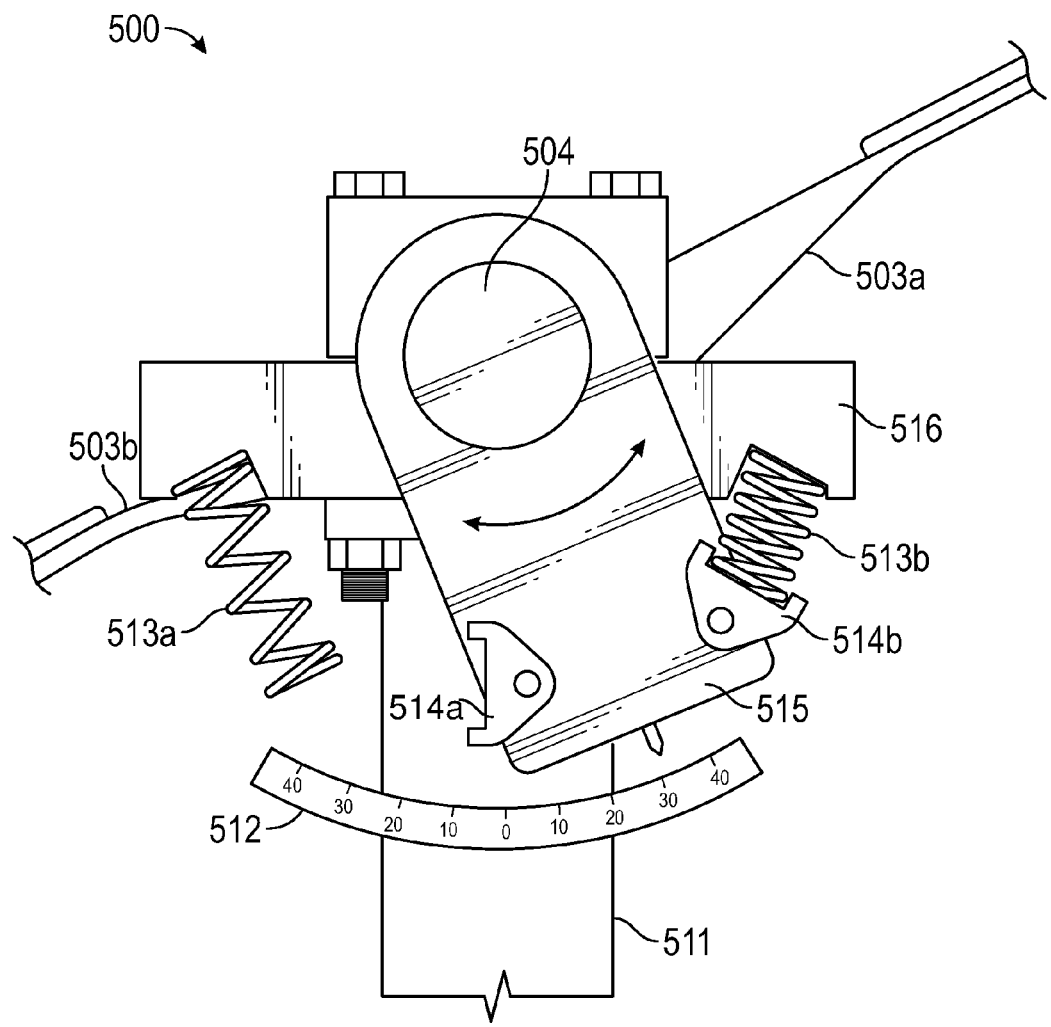
FIG. 5 shows a close-up view of an exemplary embodiment of a spring bearing system that is configured for use together with any of the solar energy collection systems described herein.

FIG. 5 shows a close-up view of an exemplary embodiment of a spring bearing system 500 that is configured for use together with any of the solar energy collection systems described herein. In some embodiments, a spring bearing system 500 comprises one or more springs 513a and 513b, an optional one or more arms 503a and 503b (or alternatively other means for coupling active components to a rod as described herein), optional support structure leg 511, optional pivoting spring seats 514a and 514b, rotating body 515, and shelf 516. The shelf can be integrated into the bearing pillow block or main bearing housing.

As described, in some embodiments, rod 504 couples with arms 503a and 503b (point of coupling not shown), and as described herein, arms 503a and 503b further couple to functional components of a solar energy collection system 500 such as, for example, one or more bifacial photovoltaic modules and/or one or more reflectors. Arms 503a and 503b along to the components to which they are respectively coupled are configured to rotate about a longitudinal horizontal central axis of the rod 504. As arms 503a and 503b rotate to around an angle equal to or greater than 10 degrees relative to a flat shelf 516 (as measured by illustrative reference 512), the weight of the components coupled to arms 503a and 503b causes an increased torque that is experienced by the rod 504.

Rotating body 515 is configured to rotate together with a rotating component of the solar energy collection system. For example, in some embodiments where the rod 504 rotates, the rotating body 515 is fixed to the rod 504 so that they rotate together. For example, in some embodiments, where the rod 504 is fixed and the active components of the solar energy collection system rotate, the rotating body 515 is coupled to the active components and rotates together with them. Shelf 516 is fixed and in some embodiments is coupled to the one or more springs 513a and 513b. Alternatively, in some embodiments, springs 513a and 513b are coupled to the rotating body 515. As shown, rotating body 515 includes optional pivoting spring seats 514a and 514b which provide, for example, smoother compression of the springs 513a and 513b. Rotating body is positioned so that as one or more of the active components of a solar energy collection system rotate into a position that increases the torque experienced by the rod 504 and/or the actuator (not shown), the rotating body 515 engages one of springs 513a or 513b and compresses the spring. The action of the compression forces of the spring 513a or 513b on the rotating body 515, counters the increased torque on the system.

Alternative Embodiments

In an alternative embodiment a solar energy collection system comprises one bifacial photovoltaic module and two sets of perpendicular reflectors, whereas each reflector lies at an of angle of approximately 45° from the bifacial photovoltaic module, whereas each set of reflectors coincide directly below one of the bifacial photovoltaic module's opposing edges, and whereas the edge of coincidence of the two sets of reflectors is coplanar with the medial plane of the bifacial photovoltaic module.

In some of the embodiments, the amount of energy collected by a solar unit can be optimized by considering the relationship between the quantity of sunlit area added by a reflector, and the efficiency of indirect solar energy harvesting according to the angle between one or more of the bifacial photovoltaic modules and reflectors. The solar unit design is such that no part of the reflector is shaded by the solar module, wherein all the light directed by a specular reflector would be diverted to the entire lower face of the solar module, and wherein the solar module is perpendicular to the sun.

While preferred embodiments of the systems, devices, and methods described herein have been shown and described herein, it will be obvious to those skilled in the art that such embodiments are provided by way of example only. Numerous variations, changes, and substitutions will now occur to those skilled in the art without departing from the subject matter described herein. It should be understood that various alternatives to the embodiments of the systems, devices, and methods described herein may be employed in practicing the systems, devices, and methods described herein. It is intended that the following claims define the scope of the invention and that methods and structures within the scope of these claims and their equivalents be covered thereby.

What is claimed is:

1. A solar energy collection system comprising:
a bifacial photovoltaic module having a first photovoltaic surface and a second photovoltaic surface;
a first reflector having a first reflective surface;
a second reflector having a second reflective surface; and
a support structure comprising a rod having a longitudinal axis about which the support structure rotates, the support structure further comprising a first arm and a second arm;
wherein the support structure couples to the bifacial photovoltaic module, the first reflector, and the second reflector;
wherein the bifacial photovoltaic module couples to the rod of the support structure and is positioned essentially horizontally relative to an outer surface of the rod so that the first photovoltaic surface faces away from the outer surface of the rod and the second photovoltaic surface faces towards the outer surface of the rod;
wherein the first reflector and the second reflector respectively couple to the first and the second arm of the support structure and are positioned so that they each face both a solar energy source and the second photovoltaic surface of the bifacial photovoltaic module thus reflecting solar energy from a solar energy source to the second photovoltaic surface.

2. The solar energy collection system of claim 1, comprising a tracking system configured to independently rotate the bifacial photovoltaic module and the first and the second reflector about the central longitudinal axis of the rod in response to a sensed or calculated position of a solar energy source.

3. The solar energy collection system of claim 1, wherein the first and the second reflector are specular reflectors configured to reflect non-diffuse light onto the second photovoltaic surface of the bifacial photovoltaic module.

4. The solar energy collection system of claim 1, wherein the support structure is configured so that it does not shade the first reflector, the second reflector, and the bifacial photovoltaic module.

5. The solar energy collection system of claim 1, wherein the first reflector and the second reflector are curved.

6. A solar energy collection system comprising:
a bifacial photovoltaic module having an upper surface that faces towards a solar energy source and a lower surface that faces away from a solar energy source;
a reflector having a reflective surface;
a solar tracker that tracks a position of the solar energy source;
a support structure comprising:
a base having a first end and a second end, wherein the first end couples with the photovoltaic module and the second end couples with the reflector so that the upper surface of the photovoltaic module faces a solar energy source and the reflective surface of the reflector faces both the solar energy source and the lower surface of the photovoltaic module; and
a rod having a central longitudinal axis about which the base rotates thus changing a position of the photovoltaic module and the reflector with respect to the solar energy source in response to a change in the position of the solar energy source that is tracked by the solar tracker.

7. The solar energy collection system of claim 6, wherein the reflector is a specular reflector.

8. The solar energy collection system of claim 6, wherein one or both of the photovoltaic module and the reflector are configured to movably coupled with the base so that they move independently of the base.

9. The solar energy collection system of claim 6, wherein the photovoltaic module and the reflector are fixedly coupled to the base.

10. The solar energy collection system of claim 6, wherein the base comprises a frame at the first end of the base that is configured to receive the bifacial photovoltaic module without covering any part of either the upper or the lower surface.

11. The solar energy collection system of claim 6, wherein the solar tracker is configured to cause the base to rotate about the central longitudinal axis of the rod in response to the position of the solar energy source with respect to the solar energy collection system thus changing a position of the bifacial photovoltaic module and the reflector with respect to the solar energy source.

12. The solar energy collection system of claim 11, wherein the solar tracker comprises a actuator configured to rotate the supporting structure about the rod.

13. A solar energy collection system comprising:
a bifacial photovoltaic module having a first photovoltaic surface and a second photovoltaic surface;
a first reflector having a first reflective surface and a second reflector having a second reflective surface; and
a support structure comprising a rod having a central longitudinal axis;
wherein the bifacial photovoltaic module, the first reflector, and the second reflector are coupled with the rod so that the bifacial photovoltaic module is positioned in between the first reflector and the second reflector, the first reflective surface is positioned opposite the first photovoltaic surface, and the second reflective surface is positioned opposite the second photovoltaic surface; and
wherein the bifacial photovoltaic module, the first reflector, and the second reflector are configured to rotate about the central longitudinal axis of the rod.

14. The solar energy collection system of claim 13, wherein the bifacial photovoltaic module, the first reflector, and the second reflector are all configured to rotate independently about the central longitudinal axis of the rod.

15. The solar energy collection system of claim 13, wherein the first reflector and the second reflector are fixedly coupled to the rod so that the position of the first reflector and the position of the second reflector are fixed.

16. The solar energy collection system of claim 13, wherein the first reflector is fixedly coupled to the rod so that the position of the first reflector is fixed.

17. The solar energy collection system of claim 13, wherein the position of the first reflector and the position of the second reflector are separated by an angle of up to 120 degrees so that the bifacial photovoltaic module is configured to rotate up to 120 degrees about the rod.

18. The solar energy collection system of claim 13, wherein the first and the second reflector are configured to rotate so that the first reflector covers the first photovoltaic surface of the bifacial photovoltaic module and the second reflector covers the second photovoltaic surface of the bifacial photovoltaic module.

19. The solar energy collection system of claim 13, comprising a tracking system configured to rotate the bifacial photovoltaic module and the first and the second reflector about the central longitudinal axis of the rod.

20. The solar energy collection system of claim 13, wherein the first and the second reflector are specular reflectors.

* * * * *